(12) United States Patent
Manuel et al.

(10) Patent No.: US 10,849,335 B2
(45) Date of Patent: Dec. 1, 2020

(54) READY-TO-DRINK TEA BEVERAGES WITH REDUCED BENZENE AND METHODS FOR MAKING SAME

(71) Applicants: NESTEC S.A., Vevey (CH); Chaidez Manuel, Los Angeles, CA (US); Cole Genevieve, Marysville, OH (US); Fu Xiaoping, Dublin, OH (US); Kuo Ching-Jung, Marysville, OH (US); Zeboudj Lise, Columbus, OH (US)

(72) Inventors: Chaidez Manuel, Los Angeles, CA (US); Cole Genevieve, Marysville, OH (US); Fu Xiaoping, Dublin, OH (US); Kuo Ching-Jung, Marysville, OH (US); Zeboudj Lise, Columbus, OH (US)

(73) Assignee: Societe des Produits Nestle S.A., Vevey (CH)

( * ) Notice: Subject to any disclaimer, the term of this patent is extended or adjusted under 35 U.S.C. 154(b) by 720 days.

(21) Appl. No.: 14/895,595

(22) PCT Filed: Jun. 3, 2013

(86) PCT No.: PCT/US2013/043887
§ 371 (c)(1),
(2) Date: Dec. 3, 2015

(87) PCT Pub. No.: WO2014/196953
PCT Pub. Date: Dec. 11, 2014

(65) Prior Publication Data
US 2016/0135477 A1 May 19, 2016

(51) Int. Cl.
*A23F 3/16* (2006.01)
*A23F 3/20* (2006.01)

(52) U.S. Cl.
CPC .............. *A23F 3/163* (2013.01); *A23F 3/20* (2013.01)

(58) Field of Classification Search
None
See application file for complete search history.

(56) References Cited

U.S. PATENT DOCUMENTS

| | | | | |
|---|---|---|---|---|
| 4,347,695 A | * | 9/1982 | Zobel | B65B 31/006 141/11 |
| 5,773,062 A | * | 6/1998 | Cirigliano | A23F 3/163 426/330.3 |
| 2002/0022099 A1 | * | 2/2002 | Schmidt | B32B 27/18 428/35.7 |
| 2002/0150657 A1 | | 10/2002 | Farr et al. | |
| 2006/0201331 A1 | | 9/2006 | Farr et al. | |
| 2007/0023100 A1 | * | 2/2007 | Blichmann | B67C 3/04 141/18 |
| 2008/0213438 A1 | | 9/2008 | Williams et al. | |
| 2009/0074927 A1 | | 3/2009 | Bonorden et al. | |
| 2010/0266724 A1 | * | 10/2010 | Tams | A23C 9/1213 426/42 |
| 2013/0022720 A1 | * | 1/2013 | Ferry | C02F 1/66 426/286 |

FOREIGN PATENT DOCUMENTS

| | | | |
|---|---|---|---|
| CN | 1079374 A | * | 12/1993 |
| CN | 1107658 A | | 9/1995 |
| CN | 101744335 A | | 6/2010 |
| CN | 202566172 | * | 12/2012 |
| GB | 1299304 | | 12/1972 |
| JP | 2004532623 | | 10/2004 |
| JP | 2005304323 | | 11/2005 |
| JP | 4965530 B2 | | 7/2012 |
| RU | 2232526 C2 | * | 11/2002 |
| WO | 02070371 | | 9/2002 |
| WO | 2007114304 A1 | | 10/2007 |
| WO | 2008112854 A1 | | 9/2008 |
| WO | 2010141441 | | 12/2010 |

OTHER PUBLICATIONS

Open Source Systems Science Solutions, OSS, Atmospheric Composition, http://ossfoundation.us/projects/environment/global-warming/atmospheric-composition, Jul. 9, 2011, pp. 1-4.*
Office Action issued in related Japanese Patent Application No. P2016-516491 dated Mar. 28, 2017. 2 pages.
Street et al., "The Status of Micronutrients (Cu, Fe, Mn, Zn) in Tea and Tea Infusions in Selected Samples Imported to the Czech Republic", Czech J. Food Science, vol. 24, No. 2, Jan. 2006, pp. 62-71.
Gardner et al., "Benzene Production from Decarboxylation of Benzoic Acid in thePresence of Ascorbic Acid and a Transition-Metal Catalyst", Journal of Agricultural and Food Chemistry, vol. 41, No. 5, May 1993, pp. 693-695.
Vinci et al., "Factors Influencing Benzene Formation from the Decarboxylation of Benzoate in Liquid Model Systems", Journal of Agricultural and Food Chemistry, vol. 59, 2011, pp. 12975-12981.
Benzene, "Production of Benzene from Ascorbic Acid and Sodium Benzoate", White Paper by AIB International, Mar. 2006, 4 pages.
Chinese Patent Office Action for Application No. CN201380077070.0, dated Aug. 4, 2020, 17 pages.

* cited by examiner

*Primary Examiner* — Anthony J Weier
(74) *Attorney, Agent, or Firm* — K&L Gates LLP

(57) ABSTRACT

A ready-to-drink tea beverage contains tea extract, aerated water and benzoate, such as a benzoic acid salt. The beverage and/or the aerated water can contain at least 5.0 ppm dioxygen (O2) and preferably at least about 5.0 ppm O2. The aerated water can reduce or prevent benzene formation and can reduce the benzene content of the beverage. The beverage can lack dimethyl dicarbonate and/or ascorbic acid. The water can be aerated before and/or after the beverage is dispensed in a can or another suitable container.

13 Claims, 4 Drawing Sheets

| StdOrder | RunOrder | CenterPt | Blocks | Sucralose (g/L) | HFCS (g/L) | Sodium benzoate (g/L) | pH | Deaeration | RO water quality | Average Bz (ppb)_1 | Dissolved O2 (ppm) | % Saturation |
|---|---|---|---|---|---|---|---|---|---|---|---|---|
| 6 | 1 | 1 | 1 | 0.16 | 70.00 | 0.30 | 2.7 | NO | PTC | 0.00 | 5.90 | 68.1 |
| 3 | 2 | 1 | 1 | 0.00 | 137.75 | 0.28 | 2.7 | NO | PTC | 0.00 | 6.39 | 73.8 |
| 4 | 3 | 1 | 1 | 0.16 | 137.75 | 0.28 | 3.0 | YES | PTC | 3.32 | 0.58 | 6.7 |
| 2 | 4 | 1 | 1 | 0.16 | 70.00 | 0.28 | 2.7 | YES | Co-manufacturer | 4.26 | 0.61 | 7.1 |
| 7 | 5 | 1 | 1 | 0.00 | 137.75 | 0.30 | 2.7 | YES | Co-manufacturer | 3.40 | 0.76 | 8.8 |
| 5 | 6 | 1 | 1 | 0.00 | 70.00 | 0.30 | 3.0 | YES | PTC | 3.46 | 0.62 | 7.2 |
| 1 | 7 | 1 | 1 | 0.00 | 70.00 | 0.28 | 3.0 | NO | Co-manufacturer | 0.00 | 6.28 | 72.5 |
| 8 | 8 | 1 | 1 | 0.16 | 137.75 | 0.30 | 3.0 | NO | Co-manufacturer | 0.00 | 5.89 | 68.4 |

FIG. 4

| Run order | De-aeration (RO Water from PTC) | Location | Benzene (µg/L or ppb) 7 days 60°C INITIAL DOE OLD CALIB PREP | Benzene (µg/L or ppb) 7 days 60°C CONF trials OLD CALIB PREP | Benzene (µg/L or ppb) 7 days 60°C INITIAL DOE NEW CALIB PREP | Benzene (µg/L or ppb) 7 days 60°C CONF trials NEW CALIB PREP |
|---|---|---|---|---|---|---|
| 3/A | YES | Glove box | 3.31 | 3.25 | 4.01 | 3.80 |
| 3/A | YES | Glove box | 3.57 | 2.12 | 4.27 | 2.70 |
| 3/A | YES | Glove box | 3.08 | 5.81 | 3.78 | 6.30 |
| 6/B | YES | Glove box | 3.09 | 8.93 | 3.79 | 9.35 |
| 6/B | YES | Glove box | 3.48 | 7.66 | 4.18 | 8.11 |
| 6/B | YES | Glove box | 3.81 | 5.87 | 4.51 | 6.36 |
| 1/E | NO | Bench | 0 (0.27) | 0 (0.62) | 0.98 | 1.23 |
| 1/E | NO | Bench | 0 (0.26) | 0 (0.56) | 0.97 | 1.18 |
| 1/E | NO | Bench | 0 (0.18) | 0 (0.52) | 0.90 | 1.13 |
| 2/F | NO | Bench | 0 (0.27) | 0 (0.16) | 0.98 | 0.79 |
| 2/F | NO | Bench | 0 (0.23) | 0.78 | 0.95 | 1.10 |
| 2/F | NO | Bench | 0 (0.32) | 0 (0.55) | 1.03 | 1.16 |

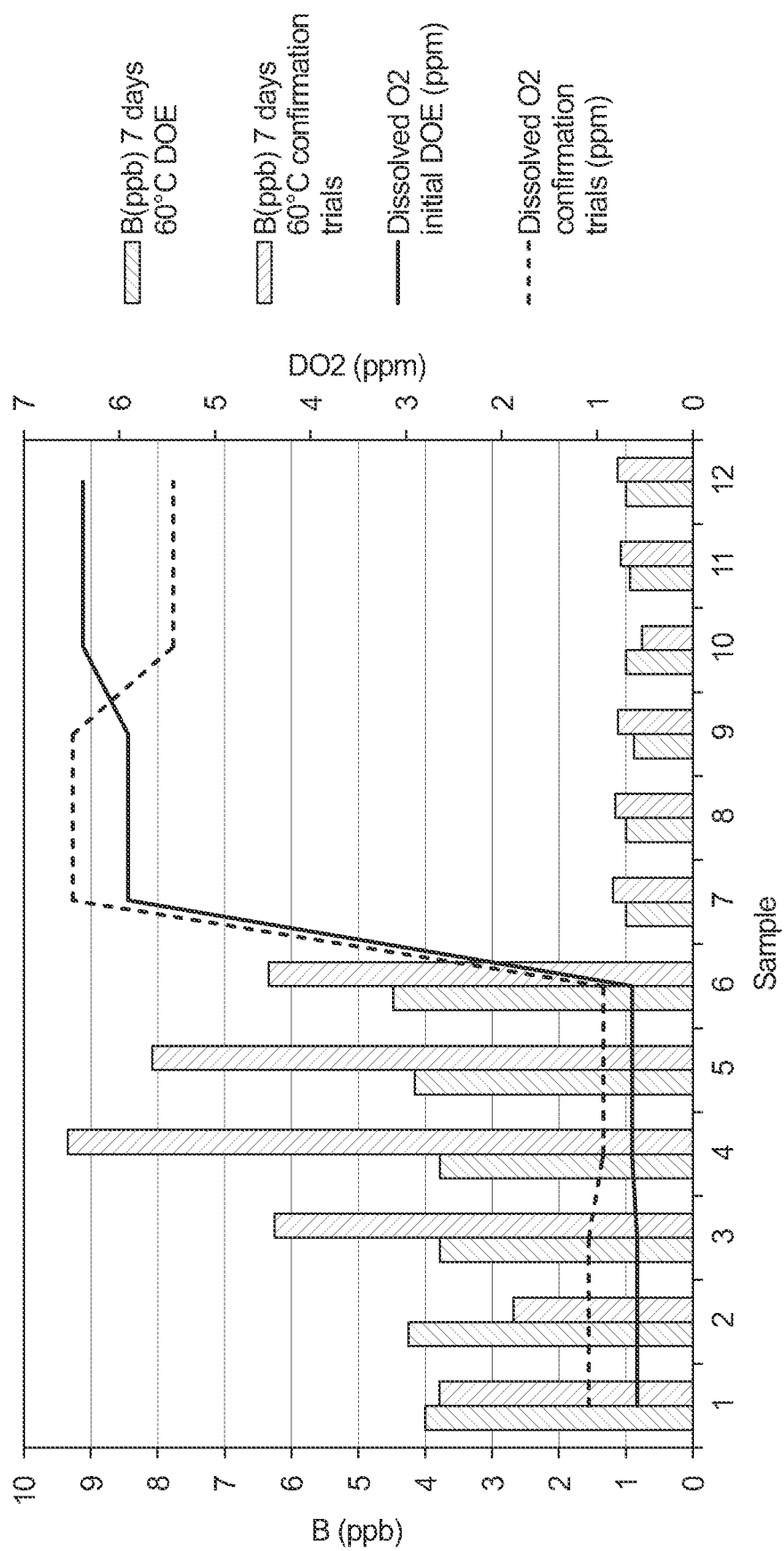

READY-TO-DRINK TEA BEVERAGES WITH REDUCED BENZENE AND METHODS FOR MAKING SAME

CROSS REFERENCE TO RELATED APPLICATIONS

The present application is a National Stage of International Application No. PCT/US2013/043887, filed on Jun. 3, 2013, the entire contents of which are being incorporated herein by reference.

BACKGROUND

The present disclosure generally relates to ready-to-drink tea beverages. More specifically, the present disclosure relates to ready-to-drink tea beverages having reduced benzene formation and methods for making same.

Benzene is a volatile organic compound (VOC) known to be carcinogenic to humans and may be present in food and beverages. Consumption of foods containing high levels of benzene can result in symptoms such as vomiting, irritation of the stomach, dizziness, sleepiness, convulsions, rapid or irregular heartbeat, and death. Longer-term exposure impacts the blood through damage to the bone marrow causing a decrease in red blood cells, leading to anemia. The immune system may also be affected, increasing the chances of infection, and leukemia may also occur.

Several sources contribute to the occurrence of benzene in foods, such as contaminated carbon dioxide used in carbonated drinks, leaching from packaging materials, contamination of environment and water supply, and food processing conditions that include irradiation treatments or high temperatures. Under such food processing conditions, the decomposition of certain amino acids (e.g., phenylalanine) and other common food ingredients such as carotene or flavor-compounds (e.g., pinene and limonene) may yield benzene. Furthermore, the decarboxylation of benzoate, a widely used food preservative, may also result in benzene formation.

Benzoates and ascorbic acid may be naturally present in foodstuffs or added as food additives. For example, sodium benzoate is a commonly used antimicrobial agent. Thus, the oxidative decarboxylation of benzoate may occur due to the presence of hydroxyl radicals in food because hydroxyl radical formation is promoted by the presence of ascorbic acid and transition metal ions (e.g., $Cu^{2+}$ or $Fe^{3+}$ ions). Ascorbic acid is generally used as an antioxidant in food formulations; however, in the presence of transition metal ions, ascorbic acid may act as a pro-oxidant by reducing the metal ions, and the resultant reduced metal ions can reduce $H_2O_2$ to form hydroxyl radicals. Other variables such as temperature and UV light are reported to affect the decarboxylation of benzoate as well.

The discovery of benzene formation from benzoate prompted special attention for beverages because beverages typically contain added benzoate as a preservative and may also be acidic. Existing solutions to mitigate benzene formation include reducing the amount of sodium benzoate, which results in the potential for microbiological contamination; completely removing sodium benzoate, which means replacing cold fill technology with costly hotfill or aseptic processing; and using dimethyl dicarbonate instead of sodium benzoate, which also is a costly approach. Another technique, using ethylenediaminetetraacetic acid (EDTA), may mitigate the formation of benzene by sequestering metal ions that may act as catalysts, but this effect may be hindered in products containing calcium or other minerals competing with the catalyst metal ions for EDTA binding.

Tea is an infusion typically made from dried leaves of *Camellia sinensis*. Calcium, Sodium, Potassium, Magnesium and Manganese are present in tea leaves at g/kg concentrations, while Chromium, Iron, Cobalt, Nickel, Copper and Zinc are present at mg/kg concentrations. As noted above, some metal ions can reduce $H_2O_2$ to form hydroxyl radicals that promote oxidative decarboxylation of benzoate. Therefore, tea may be particularly susceptible to benzene formation due to the naturally present metal ions. Moreover, formation of benzene from benzoate increases when a beverage is stored for extended periods at elevated temperatures. In this regard, the longer the shelf-life of a product, the greater the potential for benzene formation if the precursors are present. Therefore, ready-to-drink beverages may also be subject to undesirable benzene levels.

SUMMARY

The present disclosure provides methods for reducing benzene formation in a ready-to-drink tea beverage, provides ready-to-drink tea beverages having reduced benzene formation, and also provides methods for making such beverages. The methods and the beverages use aerated water, such as water aerated with dioxygen, to reduce benzene content and benzene formation.

In a general embodiment, the present disclosure provides a ready-to-drink tea beverage comprising tea extract, aerated water, and benzoate.

In an embodiment, the beverage comprises at least 2.5 ppm dioxygen ($O_2$).

In an embodiment, the benzoate is selected from the group consisting of sodium benzoate, potassium benzoate, calcium benzoate, and combinations thereof.

In an embodiment, the beverage comprises up to 0.30 g/L of the benzoate.

In an embodiment, the beverage does not contain dimethyl dicarbonate.

In an embodiment, the beverage does not contain ascorbic acid.

In another embodiment, a method for preparing a ready-to-drink tea beverage is provided. The method comprises the steps of adding benzoate to a composition used to produce the ready-to-drink tea beverage; and aerating water used in the composition to produce the ready-to-drink tea beverage.

In an embodiment, the water is aerated to comprise at least 2.5 ppm of dioxygen ($O_2$).

In an embodiment, the method further comprises dispensing the ready-to-drink tea beverage into a container, and the water is aerated with $O_2$ while in the container.

In an embodiment, the method further comprises evacuating air from the container before aerating the water.

In an embodiment, the water is aerated by gas flushing that replaces air in the container with $O_2$.

In an embodiment, the method further comprises dispensing the ready-to-drink tea beverage into a container, and the water is aerated with $O_2$ before the dispensing into the container.

In another embodiment, a ready-to-drink tea beverage is provided. The beverage comprises tea extract, aerated water and benzoate. The ready-to-drink tea beverage is shelf stable and comprises less than 0.75 ppb benzene for 7 days at 60° C.

In an embodiment, the beverage is at least 68% saturated with $O_2$.

In another embodiment, a method for reducing benzene formation in a ready-to-drink tea beverage is provided. The method comprises the steps of: aerating water to comprise at least 2.5 ppm dioxygen ($O_2$); and using benzoate and the aerated water to produce the ready-to-drink tea beverage.

An advantage of the present disclosure is to provide a method for reducing or preventing benzene formation in a ready-to-drink tea beverage.

Another advantage of the present disclosure is to provide a ready-to-drink tea beverage having reduced benzene formation and/or reduced benzene content.

Still another advantage of the present disclosure is to provide a ready-to-drink tea beverage lacking ascorbic acid and having reduced benzene formation and/or reduced benzene content.

Yet another advantage of the present disclosure is to use dissolved dioxygen ($O_2$) to reduce benzene formation and/or reduce benzene content in a ready-to-drink tea beverage.

An additional advantage of the present disclosure is to reduce benzene formation and/or reduce benzene content in a ready-to-drink tea beverage without reducing the amount of benzoate.

Another advantage of the present disclosure is to reduce benzene formation and/or reduce benzene content in a ready-to-drink tea beverage without using dimethyl dicarbonate instead of benzoate.

Still another advantage of the present disclosure is to provide a tea beverage that is shelf-stable for an extended time period without promoting benzene formation.

Yet another advantage of the present disclosure is to provide a ready-to-drink tea beverage that has less than 0.75 ppb benzene for 7 days at 60° C.

Additional features and advantages are described herein, and will be apparent from, the following Detailed Description and the Figures.

BRIEF DESCRIPTION OF THE FIGURES

FIG. 4 shows a table of the experimental results from the initial experiment and the confirmation experiment in Example 1.

FIG. 5 shows a bar graph of the experimental results from the initial experiment and the confirmation experiment in Example 1.

DETAILED DESCRIPTION

Figures 1, 2:
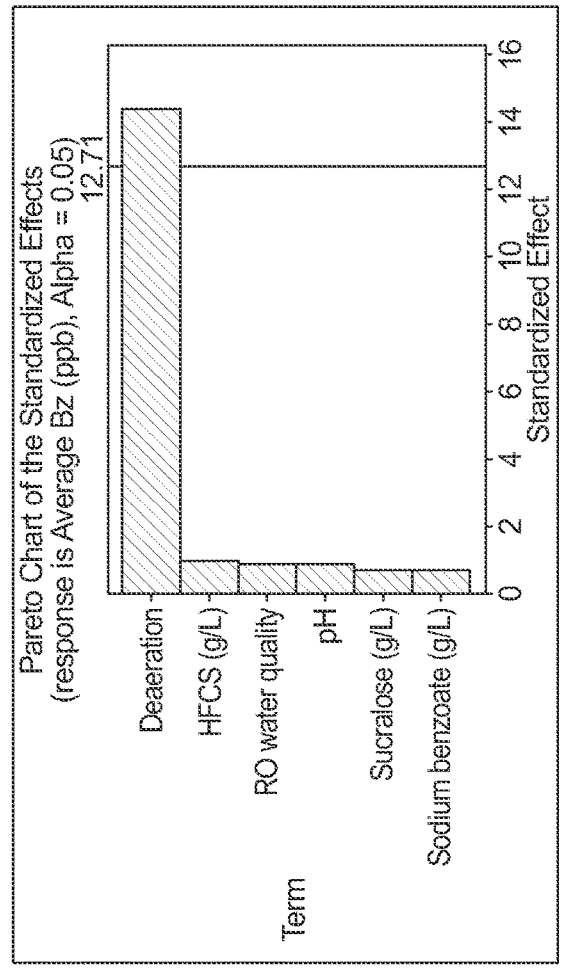
FIG. 1 shows a table of experimentally tested samples and the results in Example 1.
FIG. 2 shows a Pareto chart of the experimental results in Example 1.

All percentages expressed herein are by weight of the total weight of the composition unless expressed otherwise. When reference is made to the pH, values correspond to pH measured at 25° C. with standard equipment. As used in this disclosure and the appended claims, the singular forms "a," "an" and "the" include plural referents unless the context clearly dictates otherwise. As used herein, "about" is understood to refer to numbers in a range of numerals. Moreover, all numerical ranges herein should be understood to include all integer, whole or fractions, within the range. As used herein, "comprising," "including" and "containing" are inclusive or open-ended terms that do not exclude additional, unrecited elements or method steps. However, the tea beverage provided by the present disclosure may lack any element that is not specifically disclosed herein. Thus, "comprising," as used herein, includes "consisting essentially of" and "consisting of."

"Ready-to-drink beverage" means a beverage in liquid form that can be consumed without the further addition of liquid. "Tea" encompasses all types of leaf tea such as, for example, green tea, black tea, white tea, oolong tea, rooibos tea, chai tea, flavored tea, herbal tea, fruit tea, and combinations thereof. "Leaf tea" refers to brewable tea and optionally other ingredients in any form such as complete, cut or chiseled leaves; small fragments of leaves; powder; dust; and combinations thereof. The tea can include the tea of a single tea variety or a mixture of one or more tea varieties. The tea can be caffeinated or decaffeinated.

The present disclosure provides ready-to-drink tea beverages. These beverages can contain tea extracts that may be obtained by conventional methods such as the hot aqueous extraction of tea leaves, for example. Temperatures of the aqueous extraction may vary from room temperature to up to 180° C. or more with elevated pressures. In an embodiment, food-grade dyes, buffer salts, stabilizers, preservatives, flavorants, sweeteners, and the like may be added to the tea extract. The buffer salts can be any suitable salt such as, for example, sodium phosphate, disodium phosphate, potassium phosphate, dipotassium phosphate, sodium polyphosphate, sodium hexametaphosphate, sodium citrate, disodium citrate, potassium citrate and dipotassium citrate. Sweeteners can be sugar-based, such as sucrose, invert syrup, fructose syrup, glucose syrup with various DE, maltodextrins with various DE, and combinations thereof, for example. Sugarless sweeteners can include, but are not limited to, sugar alcohols such maltitol, xylitol, sorbitol, erythritol, mannitol, isomalt and lactitol, hydrogenated starch hydrolysates, saccharin, cyclamate, acetosulfame, an L-aspartyl-based sweetener, or mixtures thereof. In an embodiment, the ready-to-drink tea beverage comprises ethylenediaminetetraacetic acid (EDTA), preferably at an amount of about 0.03 g/L.

Further, the tea extract can be fortified with vitamins, minerals, antioxidants, probiotics and/or prebiotics. Non-limiting examples of stabilizers include gelatins, starches, gums, emulsifying agents, buffers, carbonates and the like. Non-limiting examples of minerals, vitamins and other micronutrients optionally present include vitamin A, vitamin B1, vitamin B2, vitamin B6, vitamin B12, vitamin E, vitamin K, vitamin C, vitamin D, folic acid, inositol, niacin, biotin, pantothenic acid, choline, calcium, phosphorous, iodine, iron, magnesium, copper, zinc, manganese, chloride, potassium, sodium, selenium, chromium, molybdenum, taurine, and L-carnitine.

The resultant ready-to-drink tea beverage can be filtered or may contain natural sediment. In an embodiment, the ready-to-drink tea beverage includes a suitable flavor. Such flavors can include fruit flavors, mocha, chocolate, chai, caramel, vanilla or a combination thereof. In an embodiment, the ready-to-drink tea beverage does not contain dimethyl dicarbonate. In an embodiment, the ready-to-drink tea beverage does not contain ascorbic acid.

The ready-to-drink tea beverage comprises aerated water, such as water aerated with dioxygen ($O_2$), and a benzoate, such as a benzoic acid salt. Non-limiting examples of suitable benzoic acid salts include sodium benzoate, potassium benzoate, calcium benzoate and combinations thereof. In an embodiment, the ready-to-drink tea beverage comprises up to 0.30 g/L of the benzoate. As non-limiting examples, the ready-to-drink tea beverage can comprise 0.28 g/L of the benzoate, 0.30 g/L of the benzoate, and other benzoate concentrations.

The ready-to-drink tea beverage preferably comprises the aerated water as the only water in the beverage such that the beverage does not contain non-aerated water. For example, the ready-to-drink tea beverage preferably comprises tea extract, aerated water, and the benzoate. In an embodiment, the tea beverage and/or the water in the tea beverage has at least 2.5 ppm dioxygen ($O_2$), preferably 3.5 ppm dioxygen $O_2$, more preferably 5.0 ppm dioxygen ($O_2$) and even more preferably at least about 6.0 ppm $O_2$. In an embodiment, the tea beverage and/or the water in the tea beverage is at least 68% saturated with the dioxygen ($O_2$) and preferably at least 72% saturated with the $O_2$. The ready-to-drink tea beverage can be shelf stable and have less than 0.75 ppb benzene for 7 days at 60° C.

The ready-to-drink tea beverage can be dispensed into cans or other suitable containers, for example by cold filling. In an embodiment, the water can be aerated with the $O_2$ before filling the ready-to-drink tea beverage into the containers. In an embodiment, the $O_2$ can be introduced into the headspace of the can or other container after filling the ready-to-drink tea beverage, for example by evacuating any air (e.g., nitrogen gas) from the container and then introducing the $O_2$. Evacuating air from the container can be accomplished with a vacuum. Alternatively or additionally, the $O_2$ may be introduced by gas flushing which causes the air in the container to be replaced by the $O_2$. In an embodiment, the water can be aerated before the dispensing of the beverage into cans. For example, the water can be aerated with the $O_2$ before, during and/or after the tea extract is prepared and before, during and/or after the ready-to-drink beverage is produced. In an embodiment, the required level of dissolved $O_2$ in the beverage is obtained by heating the water after aeration or exposing the water to a vacuum through a contacting system.

EXAMPLES

By way of example and not limitation, the following non-limiting examples are illustrative of various embodiments provided by the present disclosure.

Example 1

Experiments to determine the impact of different tea ingredients and processing conditions on reducing benzene content were performed. Each tea sample was prepared in a 20 milliliter (ml) vial and contained 0.03 g/ml EDTA. The tested parameters were sodium benzoate concentration, the presence or absence of sucralose, the concentration of high fructose corn syrup (HFCS), the pH as established by varying the phosphoric acid level, the water aeration (deaerated or non-deareated), and the type of reverse osmosis water treatment (helium purge or membrane). See FIG. 1.

The tea was raspberry-flavored black tea, and all other components of the tea samples besides the tested parameters were the same for each sample. Specifically, the tea contained sweetener, such as sugar and/or alternatives; black tea powder; acids; preservatives; raspberry flavorant; and water.

The presence or absence of sucralose was a tested parameter because artificial sweeteners are thought to slow down the formation of benzene. The concentration of HFCS was examined because HFCS is thought to speed up the formation of benzene. The pH was a variable because acidity is thought to promote benzene formation. The water aeration was a tested parameter because $O_2$ may play a role in benzene formation. The type of reverse osmosis water treatment was examined because ions may play a role in benzene formation. "Co-manufacturer" indicates that the reverse osmosis was performed with a helium purge, and "PTC" indicates that the reverse osmosis was performed with a membrane.

To evaluate the effect, if any, of these parameters, the samples were maintained at 60° C. for 7 days. During this time period, the samples using de-aerated water were kept in a sealed container designed to maintain the de-aeration ("glove box"). Then the benzene concentration was measured using "purge and trap" analysis as known in the art. Specifically, a non-reactive purge gas was bubbled through the samples to extract the benzene as vapor. The benzene adheres to a high-surface-area material such as activated charcoal through which the vapor is conveyed, and then the benzene condenses back into a liquid. Heating re-vaporizes the benzene and other volatile compounds adhered to the charcoal, and these compounds can be separated and analyzed by gas chromatography.

As shown in FIG. 1, Samples 3-6 that had de-aerated water (each less than 1.0 ppm $O_2$) resulted in benzene formation (3.32, 4.26, 3.40 and 3.46, respectively). In contrast, Samples 1, 2, 7 and 8 that had aerated water (5.90, 6.39, 6.28 and 5.89 ppm $O_2$, respectively) prevented benzene formation. Therefore, benzene formation was linked to water de-aeration in this initial experiment.

Figure 3:
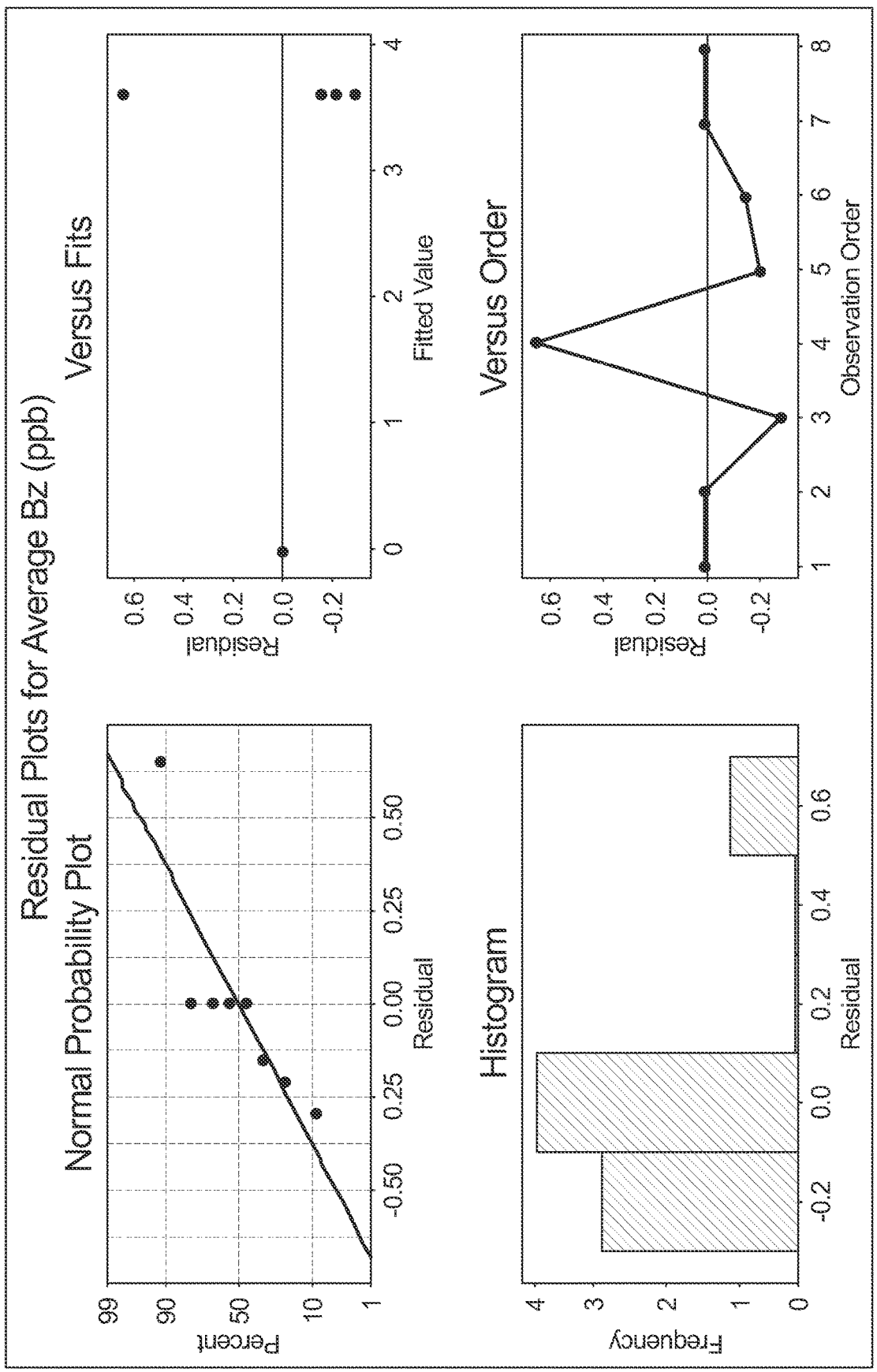
FIG. 3 shows statistical analysis of the experimental results in Example 1.

As shown in FIG. 2, a Pareto Chart was generated to determine the statistical significance of each of the tested parameters in the initial experiment. The other factors besides water aeration had an impact on benzene formation, but this impact of the other factors was not statistically significant. As shown in FIG. 3, further statistical analysis demonstrated the validity of the results.

Nevertheless, to confirm the relationship between benzene formation and water de-aeration, Samples 1, 2, 3 and 6 were repeated in a confirmation experiment. Samples 4, 5, 7 and 8 were not repeated because the type of reverse osmosis water treatment was not a factor in benzene formation. The only difference between the confirmation experiment and the initial experiment was that the confirmation experiment included 5 minutes of stirring on a plate, for calibration, after the sodium benzoate was added ("new calib prep") and the initial experiment did not include this stirring ("old calib prep").

As shown in FIGS. 4 and 5, the second experiment confirmed the relationship between benzene formation and water de-aeration shown in the first experiment. In this regard, Samples 1 and 2 with aerated water resulted in significantly less benzene than Samples 3 and 6 with de-aerated water. The detectable amount of benzene was 0.75 ppb, but some samples generated peaks below this threshold, as identified by the number in parenthesis in FIG. 4.

FIG. 5 shows a bar graph of the results for, from left to right, three runs of Sample 3, three runs of Sample 6, three runs of Sample 1, and three runs of Sample 2. For each run, the left bar is the amount of benzene formed in the initial experiments, and the right bar is the amount of benzene formed in the confirmation experiments. As shown in the figure, the initial experiments resulted in no detectable benzene (less than 0.75 ppb benzene) for Samples 1 and 2.

Without wishing to be bound by theory, the present inventors believe that benzoate may react with tea polyphenols to form esters having a lower activation energy for benzene formation, and oxygen could reduce the hydroxyl contained in the tea polyphenols to limit the esterification.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method for making a ready-to-drink tea beverage, the method comprising:
adding benzoate to a composition used to produce the ready-to-drink tea beverage; and
aerating water used in the composition to produce the ready-to-drink tea beverage, wherein the water is aerated to comprise at least 3.5 ppm of dioxygen ($O_2$).

2. The method of claim 1 comprising dispensing the ready-to-drink tea beverage into a container, and aerating the water with $O_2$ while in the container.

3. The method of claim 2 comprising evacuating air from the container before aerating the water.

4. The method of claim 2 wherein the water is aerated by flushing with a gas that replaces air in the container with $O_2$.

5. The method of claim 1 comprising dispensing the ready-to-drink tea beverage into a container, and aerating the water with $O_2$ before the dispensing into the container.

6. The method of claim 1, wherein the water is aerated to comprise at least 6 ppm of dioxygen ($O_2$).

7. The method of claim 1, wherein at least one of the ready-to-drink tea beverage or the water is at least 68% saturated with dioxygen ($O_2$).

8. The method of claim 1, wherein the benzoate is added such that the ready-to-drink tea beverage comprises 0.30 g/L of benzoate.

9. The method of claim 1, wherein the water is aerated to comprise at least 5.0 ppm of dioxygen ($O_2$).

10. A method for reducing benzene formation in a ready-to-drink tea beverage, the method comprising:
aerating water to comprise at least 3.5 ppm dioxygen ($O_2$); and
using benzoate and the aerated water to produce the ready-to-drink tea beverage.

11. The method of claim 10 comprising aerating the water to comprise at least 6 ppm of dioxygen ($O_2$).

12. The method of claim 10, wherein at least one of the ready-to-drink tea beverage or the water is at least 68% saturated with dioxygen ($O_2$).

13. The method of claim 10, wherein the method comprises aerating the water to comprise at least 5.0 ppm of dioxygen ($O_2$).

* * * * *